United States Patent [19]

Bowers et al.

[11] 4,087,591

[45] May 2, 1978

[54] PYROTECHNICALLY ACTIVATED LITHIUM-CHLORINE CELL HAVING A LITHIUM VAPOR BARRIER

[75] Inventors: Frederic M. Bowers, Silver Spring; Judith H. Ambrus, Beltsville; Michael E. DeGraba, Kensington, all of Md.

[73] Assignee: The United States of America as represented by the Secretary of the Navy, Washington, D.C.

[21] Appl. No.: 757,549

[22] Filed: Dec. 30, 1976

[51] Int. Cl.$^2$ .................. H01M 8/14; H01M 8/36
[52] U.S. Cl. ................................ 429/29; 429/103; 429/112
[58] Field of Search ............... 429/12, 29, 103, 112

[56] References Cited

U.S. PATENT DOCUMENTS 3,909,297  9/1975  Zeitner et al. .................. 429/29
3,972,730  8/1976  Bowers et al. .................. 429/103 X Primary Examiner—Leland A. Sebastian
Attorney, Agent, or Firm—R. S. Sciascia; A. L. Branning; H. B. Field

[57] ABSTRACT

A high efficiency pyrotechnically activated lithium-chlorine primary cell having a high voltage output, high energy density, and a high rate of discharge comprises a porous graphite gas diffuser, a fused alkali metal salt electrolyte, a lithium anode in contact with the electrolyte, a lithium vapor barrier, and a cartridge containing a pyrotechnic material disposed within the anode, all of the components being stacked inside a container which serves as the cell case. The lithium vapor barrier comprises a porous metal ring impregnated with lithium-chloride and is designed to prevent vaporized lithium from penetrating the barrier, contacting the chlorine cover gas and exothermically reacting.

7 Claims, 1 Drawing Figure

U.S.Patent    May 2, 1978    4,087,591
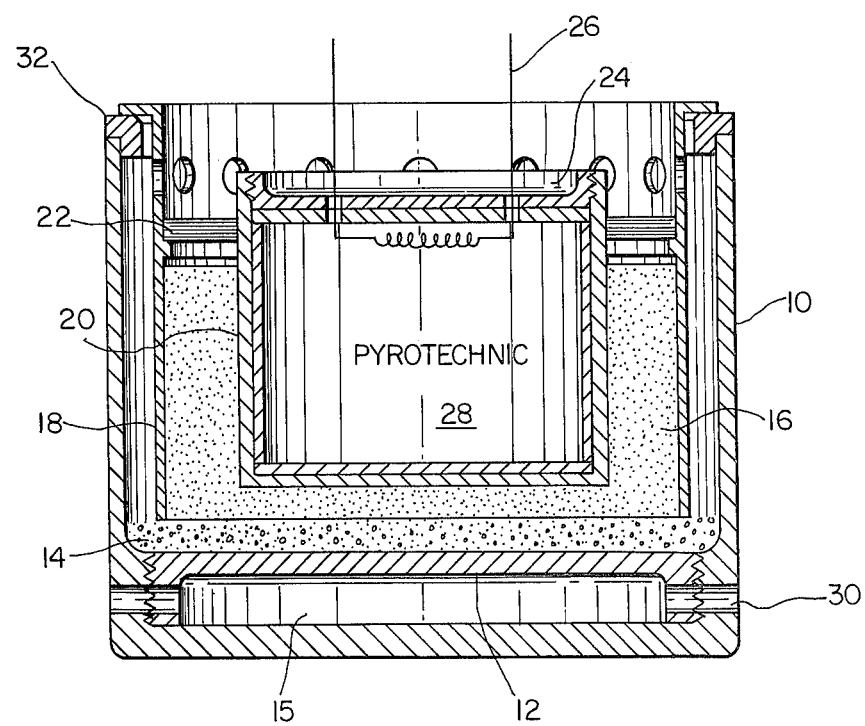

PYROTECHNICALLY ACTIVATED LITHIUM-CHLORINE CELL HAVING A LITHIUM VAPOR BARRIER

BACKGROUND OF THE INVENTION

This invention relates to electrochemical energy producing cells, and more particularly to lithium-chlorine fused salt electrolyte primary cells and batteries. Specifically, the invention relates to lithium-chlorine fused salt electrolyte primary cells and batteries having high voltage a high rate of discharge and high energy density which utilize a self-contained heat source for quick activation.

Much of the initial research and development of lithium-chlorine fused salt electrolyte cells was performed by workers at the General Motors Corporation. For example, see: Swinkels, *Journal of the Electrochemical Society*, Vol. 113, No. 1, pp. 6–10 (1966); Hietbrink et al., *Advances in Energy Conversion Engineering, Papers, Critiques and Summaries from the Intersociety Energy Conversion Engineering Conference*, pp. 933–41 (1967); Wilcox *Proceedings, Annual Power Sources Conference*, Vol. 21, pp. 39–42 (1967); Eliason et al, *Advances in Chemistry Series*, No. 64, pp. 186–97 (1967); Craig, U.S. Pat. Nos. 3,488,244, 3,560,265, and 3,575,720; Ross, U.S. Pat. No. 3,551,206; and Petraits et al., U.S. Pat. No. 3,586,540.

The lithium-chlorine cells which resulted from the General Motors research attained high energy and power densities and usually employed an external heat source, i.e., one which was outside of the cell itself. Typically, the cells were heated in a furnace, or oven. These cells had an activation time of approximately 4 minutes.

Most military applications of electrochemical energy producing cells, such as in torpedoes, missiles and small underwater vehicles, require that the activation time of the cell must be very short, e.g. less than 30 seconds. Furthermore, in situations where space limitations are critical, such as in torpedoes, for example, it is not feasible to utilize an electrochemical cell requiring an external heating source.

Thus, a lithium-chlorine fused salt electrolyte cell utilizing an external heating source which gives cell activation times measurable in minutes is impractical for military applications in general, and naval underwater applications in particular. Furthermore, during the pyrotechnic activation of lithium-chlorine cells, lithium vapor has a tendency to form along the pyrotechnic cartridge-lithium interface. The vapor then reacts with the surrounding chlorine gas and produces heat which in turn keeps the anode temperature high enough so that lithium vapor is formed throughout the entire discharge. As a result, a significant amount of lithium is lost through this parasitic reaction and the coulombic efficiency of the anode is severly impaired.

Notwithstanding these and other problems associated with a lithium-chlorine fused salt electrolyte cell, such a high energy density cell would be particularly useful in the fabrication of a primary battery suitable for naval underwater and other military applications.

SUMMARY OF THE INVENTION

Accordingly, there is provided by the present invention a high efficiency pyrotechnic activated lithium-chlorine fused salt electrolyte cell which is fabricated from a porous graphite gas diffuser, a fused alkali metal salt electrolyte, a lithium anode in contact with an electrolyte, a porous nickel metal vapor barrier impregnated with lithium chloride and a cartridge containing a pyrotechnic material disposed within the anode. All of the above components are sticked inside a container which serves as a cell case. The porous gas diffuser is positioned within the case to provide a chlorine gas receiving chamber. Chlorine is introduced directly into the gas diffuser through the gas receiving chamber. As the pyrotechnic material is ignited it provides sufficient heat to melt the electrolyte, the lithium-chloride in the vapor barrier, and to heat the entire cell to its operating temperature, thus causing current to flow. During cell operation, the anodic lithium adjacent to the pyrotechnic metal cartridge vaporizes and rises until it reaches the vapor barrier. The barrier prevents the lithium vapor from containing the free chlorine cover gas, which surrounds the cell, and thereby prevents the exothermic reaction between these two potential reactants. By preventing this exothermic reaction cell temperature can be controlled, lithium losses can be reduced, and cell efficiency can be greatly increased.

OBJECTS OF THE INVENTION

Therefore, it is an object of the present invention to provide a lithium-chlorine pyrotechnic cell having a lithium vapor barrier.

Another object of the present invention is to provide a lithium-chlorine pyrotechnic cell having a relatively high coulombic efficiency.

Yet another object of this invention is to provide a pyrotechnically activated lithium-chlorine cell having high voltage, high energy density and a high rate of discharge.

A further object of this invention is to provide a pyrotechnically activated lithium-chlorine cell composed of elements which are chemically and electrically compatible with one another.

Another object of this invention is to provide a high voltage pyrotechnically activated lithium-chlorine cell having high energy density and a high rate of discharge which operates in a predictable manner.

Yet another object of this invention is to provide a battery composed of lithium-chlorine cells having self-contained heat sources which permit rapid activation of the battery.

Other objects and further scope of applicability of the present invention will become apparent from the detailed description given hereinafter; it should be understood, however, that the detailed description, while indicating preferred embodiments of the invention is given by way of illustration only, since various changes and modifications within the spirit and scope of the invention will become apparent to those skilled in the art from this detailed description. It should also be understood that the foregoing abstract of the disclosure is for the purpose of providing a non-legal brief statement to serve as a searching-scanning tool for scientists, engineers and researchers and is not intended to limit the scope of the invention as disclosed herein nor is it intended that it should be used in interpreting or in any way limiting the scope or fair meaning of the appended claims.

BRIEF DESCRIPTION OF THE DRAWING

The sole FIGURE of the drawing is a cross-sectional view of a preferred embodiment of the pyrotechnically activated lithium-chlorine cell constructed in accordance with the invention.

DESCRIPTION OF THE PREFERRED EMBODIMENT

Many problem areas were encountered in the development of the design of a workable lithium-chlorine fused salt electrolyte cell having a self-contained heating source for rapid activation. One of the problem areas involved the selection of materials. It was necessary to select materials which are both electrically and chemically compatible with one another. Thus, materials were chosen which were neither subject to chemical breakdown due to interaction with other cell components at the high temperature produced within cell, nor likely to undergo electrical malfunction due to short circuiting, for example.

As shown in the drawing, a lithium-chlorine fused salt electrolyte primary cell fabricated in accordance with the instant invention includes a container that serves as a cell case 10. The cell case is preferably constructed of dense graphite, however, other materials such as ceramics which are compatible with the other components employed in the cell may also be used. A porous graphite gas diffuser 12 serves as the cathode reaction site. The gas diffuser is positioned within the cell case to provide a gas receiving chamber 15. A particularly suitable material for use as the cell case is POCO AXF-5Q. A particularly suitable material for the porous gas diffuser is POCO AX. POCO is a trademark for a series of unique finegrained, high strength, isotropic, formed graphite materials available from POCO Graphite, Inc., a subsidiary of Union Oil Co. of California. These graphite materials are not wetted by the molten electrolyte and are not attacked by chlorine gas.

The shapes of the cell case 10 and the gas diffuser 12 may vary. For example, they may be either circular or rectangular. However, circular shapes are preferred due to the case of fabrication and ready availability of such materials.

A fused salt electrolyte 14, usually in the form of a disc or pellet, is positioned on top of the porous gas diffuser 12. Suitable fused salt electrolytes are alkali metal salts, for example, lithium chloride, potassium chloride or mixtures of alkali metal salts.

The main criteria for selection of an alkali metal fused salt electrolyte is that it be capable of melting due to the heat provided by the pyrotechnic material, and be capable of sustaining current flow at the operating temperature of the cell.

The preferred electrolyte for use in the cells made in accordance with the invention is a lithium chloride-potassium chloride eutectic mixture.

The anode 16 is a lithium impregnated metal matrix. The metal matrix has a high wetting affinity for molten lithium and impedes the free movement of the lithium out of the anode thereby minimizing the possibility of a short circuit caused by molten lithium bridging the space between the anode and cathode. Examples of the metal matrix are metallic sponges, metallic wools, compressed and sintered fibermetal mats, wire mesh, and layers of metal screen. The preferred metal matrix is nickel Feltmetal. Feltmetal is a trademark for a randomly interlocked structure of metal fibers which are sintered together to provide strong, permeable materials with precisely controlled properties. Feltmetal is made and sold by Huyck Metals Co. The composition of the metal matrix must be compatible with the corrosive environment of the lithium-chlorine system. Suitable metals are nickel, or nickel alloys such as Chromel, a heat resistant nickel-chromium alloy, and nickel 200. The preferred metal is nickel 200. Although this nickel alloy is slightly attacked by hot chlorine gas the nickel chloride which is formed does not interfere with the cell operation. Moreover, the attack on the alloy is slow enough to be insignificant in the time span of normal operation. The use of other metal components may result in the formation of harmful salts, e.g. $FeCl_3$, which have a tendency to wet the porous graphite rendering it unfit as a gas diffuser.

The anode 16 is provided with a shield 18 to prevent the reaction of chlorine gas with lithium in the upper portion of the cell. The preferred anode shielding material is also nickel 200. The shield 18 surrounds the metal matrix and may be provided with an ear that serves an electrical connector.

Another of the problem areas associated with the development of a functional pyrotechnically activated lithium-chlorine cell has been the low electrochemical efficiency of the lithium anode. As shown in U.S. Pat. No. 3,972,730 to Bowers et al, included herein by reference, the electrochemical efficiency of the lithium anode was approximately 50 percent. Early testing revealed that lithium vapor was formed at the interface of the lithium anode 16 and the pyrotechnic metal cartridge 20. As the vapor rose above the anode it contacted the chlorine cover gas and reacted exothermically. This exothermic reaction inturn generated more heat causing more lithium to vaporize and resulted in a cyclic exothermic side reaction of lithium and chlorine thereby consuming valuable lithium. It has now been discovered that the coulombic efficiency of the lithium anode can be greatly increased if the chemical reaction between the vaporized lithium and the chlorine cover gas can be controlled. Various attempts were made to limit the above reaction, the first of which consisted of placing a molten salt barrier on top of the anode 16. Accordingly, LiCl—KCl eutectic was spread over the top of the anode 16 so that a molten salt barrier was formed above 352° C. Although this showed an improvement, it was only partially successful.

A second test replaced the LiCl—KCl molten salt barrier with a porous nickel Feltmetal, as defined above, ring impregnated with LiCl—KCL eutectic. This vapor barrier 22 was positioned so that it fit snugly above the lithium anode 16 and between the pyrotechnic metal cartridge 20 and the shield 18. Test results were again only partially successful as evidenced by the fact that the coulombic efficiency of the lithium was approximately 58%.

A final test set revealed that a porous metal ring impregnated with lithium-chloride and ranging from about 1/32nd to about 1/16th of an inch thick was the most desirable vapor barrier. Although the porous metal ring used during testing was the forementioned nickel Feltmetal, nickel or any nickel alloy will function adequately. Other compositions will also function within the cell, however, the only criteria which must be met is, that when the selected composition comes in contact with the chlorine cover gas, it must not produce a low boiling or melting chloride. The final test system additionally revealed that by replacing the LiCl—KCl eutectic with lithium chloride, the possibility of a reaction between the lithium vapor and the potassium chloride fraction of the LiCl—KCl eutectic was eliminated and finally, that the melting point of the vapor barrier was raised to a desirable 613° C. Test results in the form of voltage, current-time and temperature-time curves showed that cell temperature was controlled and that lithium anode efficiency was greatly improved.

In a preferred embodiment of the invention the anode material is prepared by filling a cup shaped nickel 200 Feltmetal matrix with lithium in an 800° C oven by capillary action.

The metal matrix is cup shaped to allow the disposition of a pyrotechnic cartridge 20 within the anode 16. The cartridge may be made of any metal that is inert to the corrosive environment of the cell such as the nickel alloys mentioned above. In a preferred embodiment of the invention the pyrotechnic cartridge 20 is a nickel 200 cartridge which is lined with graphite. The pyrotechnic cartridge is provided with a cover 24 having openings therein to receive the pyrotechnic heating means 26. An electrical heating element is shown in the drawing, but it may be replaced by other suitable heating devices, such as a stab primer.

The cartridge 20 is filled with pyrotechnic material 28. Suitable pyrotechnic materials are those disclosed in U.S. Pat. No. 3,503,814, incorporated herein by reference. The preferred pyrotechnic material is a mixture of aluminum, nickel and ferric oxide. This composition has a heat of reaction of 704 cal./gm. upon ignition. The reaction is rapid and produces no gaseous reaction products.

The cell case 10 is provided with a chlorine inlet 30 which permits introduction of chlorine gas into the cell from a chlorine storage tank (not shown).

The cell case 10 is also provided with an insulator which insulates the anode from the cell case which is at cathode potential. The insulator acts as a lining for the cell case and preferably has an L shaped portion at the bottom that serves as a spacer between the anode and cathode. Various refractory materials provide satisfactory electrical insulation. Some examples are boron nitride, aluminum oxide, and aluminum nitride. Boron nitride is the preferred insulator material.

The operation of the cell may best be described with reference to the drawing. Upon receipt of an activation signal, the pyrotechnic heating means 26 heats up and ignites the pyrotechnic material 28. At the same time, chlorine gas is admitted to the gas receiving chamber 15 through the chlorine inlet 30. The heat generated by the pyrotechnic material is transferred through the anode 16 into the fused salt electrolyte 14. Activation is complete when the electrolyte is melted and the chlorine gas diffuses through the porous graphite gas diffuser 12. As the cell is discharged, the anode is oxidized losing electrons to the external circuit and chlorine gas is reduced, gaining electrons from the external circuit. The overall cell action is

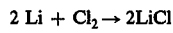

$$2\,Li + Cl_2 \rightarrow 2LiCl$$

Another problem area encountered in the development of the cell design of the present invention involved heat management. This problem necessitated determining the best way to conduct sufficient heat from the pyrotechnic reaction into the electrolyte which must be heated to its melting point and maintained above this temperature during discharge. It was discovered that the heat flow must be unimpeded from the pyrotechnic cartridge to the electrolyte since gas gaps of 0.1 millimeter between the cartridge and the anode material can slow the start up time by as much as 60 seconds. To ensure that no gas gaps are present between the pyrotechnic cartridge and the anode material the procedure for filling the metal matrix, described above, is carried out with the pyrotechnic cartridge in place so that any gap between the cartridge and the Feltmetal is filled with lithium.

It was also discovered that the fused salt electrolyte should be in intimate contact with the anode to avoid localized melting and recrystallization of the electrolyte.

The chlorine gas may be fed to the cathode by various methods which are commonly used to feed gaseous reactants to fuel cell electrodes. The "flow-by" method involves flowing excess feed gas past the backside of the porous gas diffuser, thereby maintaining the electroinert impurity mole fraction in the gas receiving chamber at approximately the supply gas level.

The "flow-through" method involves flowing excess feed gas through the porous gas diffuser with the excess gas bubbling through the electrolyte, thereby purging the diffuser of electroinert impurities.

The "dead-ended" method involves teminating the gas supply at the gas-electrolyte interface.

Any of these three methods may be employed in the present invention.

The "flow-through" and "flow-by" methods of feeding chlorine to the cathode have the advantage of longer operating times because the electroinert impurities are purged from the cathode. However, these methods may require provisions in the cell design for varying the supply of feed gas to compensate for changes in the discharge load, and for venting excess chlorine which accumulates in the cell.

The "dead-ended" method offers the advantage of design simplicity, but the operating time is limited due to accumulation of gaseous impurities in the pores of the electrode.

Still another problem encountered in the development of the present cell design involved lithium movement out of the anode. This problem was partially solved by the anode structure described in detail above. The nickel Feltmetal matrix is particularly suited for holding the molten lithium in place. Furthermore, and of primary importance in the subject invention, is the vapor barrier 22 which prevents the loss of vaporized lithium. Upon cell activation, the heat generated by the pyrotechnic vaporizes the lithium at the interface of the anode 16 and the metal cartridge 20 and also melts the lithium chloride in the vapor barrier. As the vaporized lithium rises, it contacts the vapor barrier where it is prevented from penetrating the barrier and contacting the chlorine cover gas. Should pressure build up between the anode 16 and the barrier 22, some lithium vapor may bubble through the barrier. However, in that the lithium chloride in the barrier is in liquid form, any voids which may be created by a bubble of lithium vapor passing through the barrier are immediately resealed. By preventing the lithium vapor from contacting the chlorine cover gas the heat generated by the resulting reaction is eliminated, cell temperature is controlled, less lithium is vaporized and wasted in side reactions, and the overall coulombic efficiency of the cell is increased.

The internal resistance of the cell posed yet another problem in the development of the present cell design, it was discovered for example, that the pressure and purity of the chlorine gas has a significant effect on the polarization of the cell electrodes. By introducing chlorine gas of 99.9 percent purity at a pressure of about 5 atmospheres, as measured on either side of the gas diffuser, the internal resistance due to polarization was minimized.

It was also discovered that the particular way in which the cell components were joined has a significant effect on the internal resistance of the cell. For example, as a result of designing the porous graphite diffuser to be positioned within the cell case by means of screw threads as opposed to a refractory bonding cement a significant reduction in the internal resistance of the cell was observed.

Other cell designs, such as a cylindrical arrangement in which the cell components were fashioned as cylinders which were concentrically disposed one within another, were tested but the operation of such cells was found to be inconsistent and the results often unreproducible. On the other hand, the electrochemical cell of the present invention employing the "wafer" design is the first pyrotechnically activated lithium-chlorine fused salt electrolyte cell to operate in a predictable fashion. Moreover, the cell of the present invention has twice the energy density at a high rate of discharge as compared to the silver oxide-zinc cells presently being used for military applications.

The discussion of problem areas and their solutions hereinabove is intended to emphasize the optimum or best mode of carrying out the invention and in no manner are they to be construed as limiting factors with regard to the operability of the invention.

EXAMPLE

A lithium-chlorine fused salt electrolyte cell embodying the novel features of the present invention was fabricated in accordance with the following description.

The cell case was a Poco AXF-5Q dense graphite cup 5.1 cm in diameter × 4.6 cm high. A 1.8 mm thick wafer of Poco AX porous graphite served as the gas diffuser and was fastened into the cup by means of a screw thread thereby forming a gas receiving chamber 4.0 mm high.

The electrolyte consisted of a 1.5 mm thick wafer of lithium chloride-potassium chloride eutectic salt which was precast prior to assembly.

The anode, lithium, was held in a cup shaped nickel 200 Feltmetal matrix. A nickel 200 shield surrounded the matrix.

The vapor barrier was securely positioned above the anode. It comprised a compressed, sintered fibermetal mat such as the nickel 200 Feltmetal ring and was impregnated with lithium chloride.

The anode was insulated from the cell case by a boron nitride insulator which extended downward to serve as a lining for the cell case.

The pyrotechnic material used for activation was Pyronol No. 2, a mixture of aluminum, nickel and iron oxide.

The complete cell including the pyrotechnic material, the lithium and the salt (but not the chlorine) weighed about 200 gm.

Cells of this construction were successfully and reproducibly activated in less than 30 seconds and discharged at 60 amperes and 2.1–2.5 volts for 18 minutes. The electrochemical efficiency of the lithium anode was approximately 81 percent.

A battery composed of cells of the present invention may be simply prepared by stacking the cells one on top of the other in series such that the anode of the bottom cell is in contact with the cathode of the cell directly above it, and so on. The stack of cells may be provided with a suitable clamping means to hold the cells firmly against one another in order to decrease the electrical resistance at the cell junctions. It is also possible to insert the stack of cells in a cylindrical heat resistant sheath, such as a ceramic tube, having a closure which provides the pressure necessary to ensure good electrical contact between the individual cell.

Obviously numerous modifications and variations of the present invention as possible in light of the above teachings. It is therefore to be understood that, within the scope of the appended claims, the invention may be practiced otherwise than as specifically described.

What is claimed as new and desired to be secured by Letters Patent of the United States is

1. A pyrotechnically activated, high efficiency lithium-chlorine primary cell comprising:
   a cell case;
   a porous graphite wafer positioned within the cell case to provide a gas receiving chamber;
   a fused salt electrolyte contiguous to the porous graphite wafer;
   an anode comprising a metal shield which contains a lithium impregnated metal matrix, the anode being in contact with the electrolyte and insulated from the cell case by a refractory electrical insulator, wherein the metal of the shield and the metal of the matrix are selected from the group consisting of nickel and nickel alloys;
   a metal cartridge containing a pyrotechnic material, the cartridge being disposed within the anode, wherein the metal is selected from the group consisting of nickel and nickel alloys;
   a vapor barrier comprising a porous metal ring impregnated with lithium-chloride said barrier being disposed above said anode and contiguous with both said metal shield and said metal cartridge, wherein the metal of said ring is selected from the group consisting of nickel and nickel alloys;
   a source of $Cl_2$ gas;
   means to introduce the $Cl_2$ gas into the gas receiving chamber; and
   means to activate the pyrotechnic material; wherein, chlorine gas is introduced into the gas receiving chamber and passed through the porous graphite wafer as the pyrotechnic material is activated thereby providing sufficient heat to melt the electrolyte, and to heat the entire cell to its operating temperature, thus generating the flow of ions between the cell electrodes.

2. The cell of claim 1 wherein said porous metal ring is a compressed, sintered fibermetal mat.

3. The cell as claimed in claim 2 wherein said vapor barrier is about 1.5 mm thick.

4. A battery comprising a plurality of the pyrotechnically activated lithium-chlorine primary cells as claimed in claim 1.

5. In combination with a pyrotechnically activated lithium-chlorine primary cell of the type which includes:
   a cell case which comprises a cylindrical, dense graphite cell case, the walls of said cell case being line with a BN insulator;
   a porous graphite wafer positioned within the cell case to provide a gas receiving chamber;
   a LiCl—KCl eutectic fused salt electrolyte contiguous to the porous graphite wafer;

an anode which comprises a nickel 200 cylinder containing a lithium impregnated nickel 200 compressed, sintered fibermetal mat, the anode being in intimate contact with the electrolyte and insulated from the cell case by the BN insulator;

cylindrical graphite-line nickel 200 cartridge containing a mixture of aluminum, nickel and ferric oxide, the cartridge being concentrically disposed within and in intimate contact with the anode;

a source of $Cl_2$ gas;

an inlet to introduce the $Cl_2$ gas into the gas receiving chamber; and an electrical heating element to activate the pyrotechnic material; wherein, chlorine gas is introduced into the gas receiving chamber and passed through the porous graphite wafer as the pyrotechnic material is activated thereby providing sufficient heat to melt the electrolyte, and to heat the entire cell to its operating temperature, thus generating the flow of ions between the cell electrodes, and wherein the improvement comprises:

a vapor barrier comprising a porous metal ring impregnated with lithium-chloride said barrier being disposed above said anode and contiguous with both said metal shield and said metal cartridge, and wherein the metal of said ring is selected from the group consisting of nickel and nickel alloys.

6. The cell of claim 5 wherein said porous metal ring is a compressed, sintered, fibermetal mat.

7. The cell of claim 6 wherein said vapor barrier is about 1.5 mm thick.

* * * * *